Oct. 8, 1963
F. E. PORAMBO
3,106,151
AUTOMATIC CRULLER MACHINE
Filed Dec. 16, 1960
2 Sheets-Sheet 1
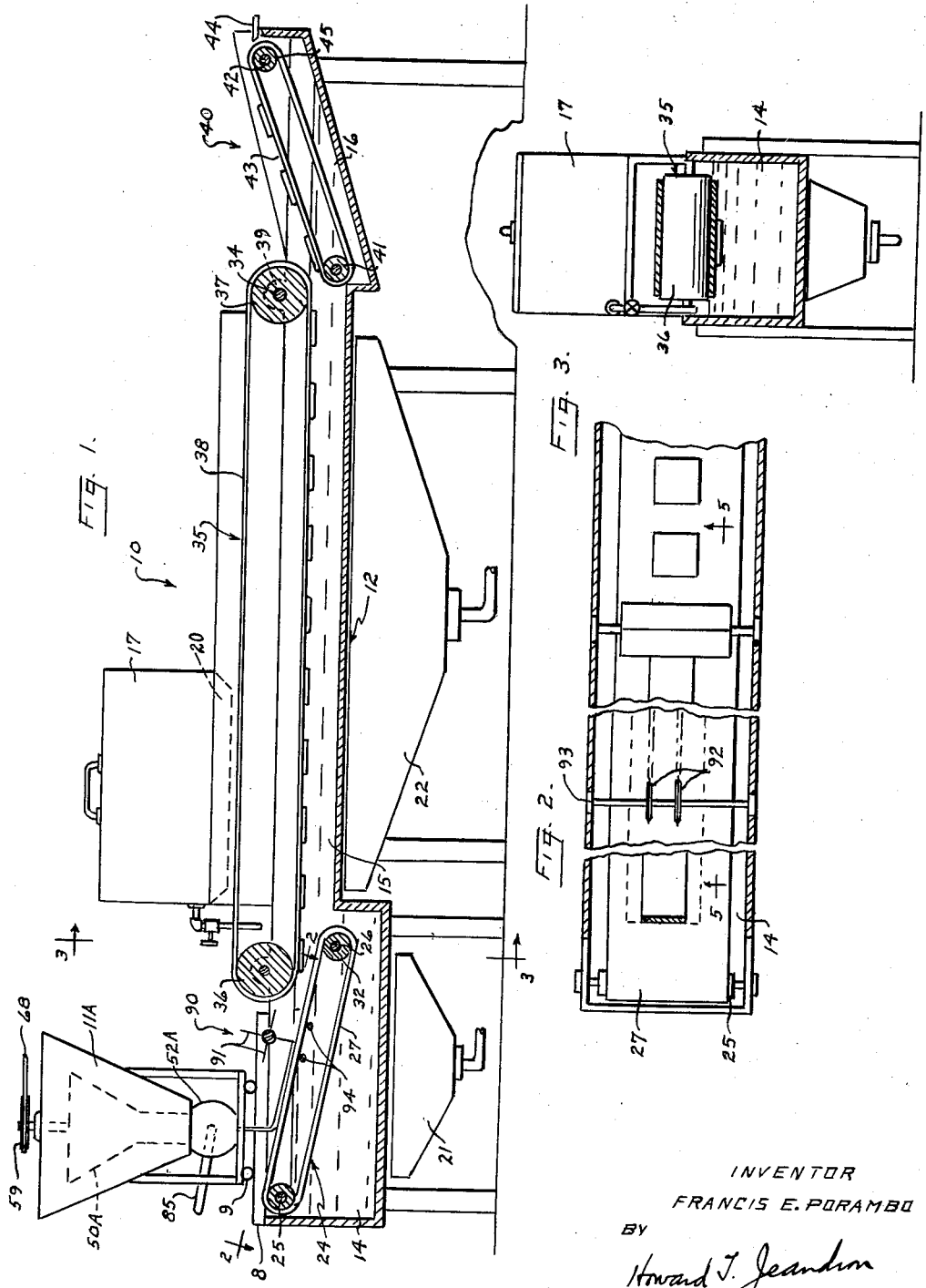
INVENTOR
FRANCIS E. PORAMBO
BY
Howard T. Jeandron
AGENT Oct. 8, 1963 F. E. PORAMBO 3,106,151
AUTOMATIC CRULLER MACHINE
Filed Dec. 16, 1960 2 Sheets-Sheet 2
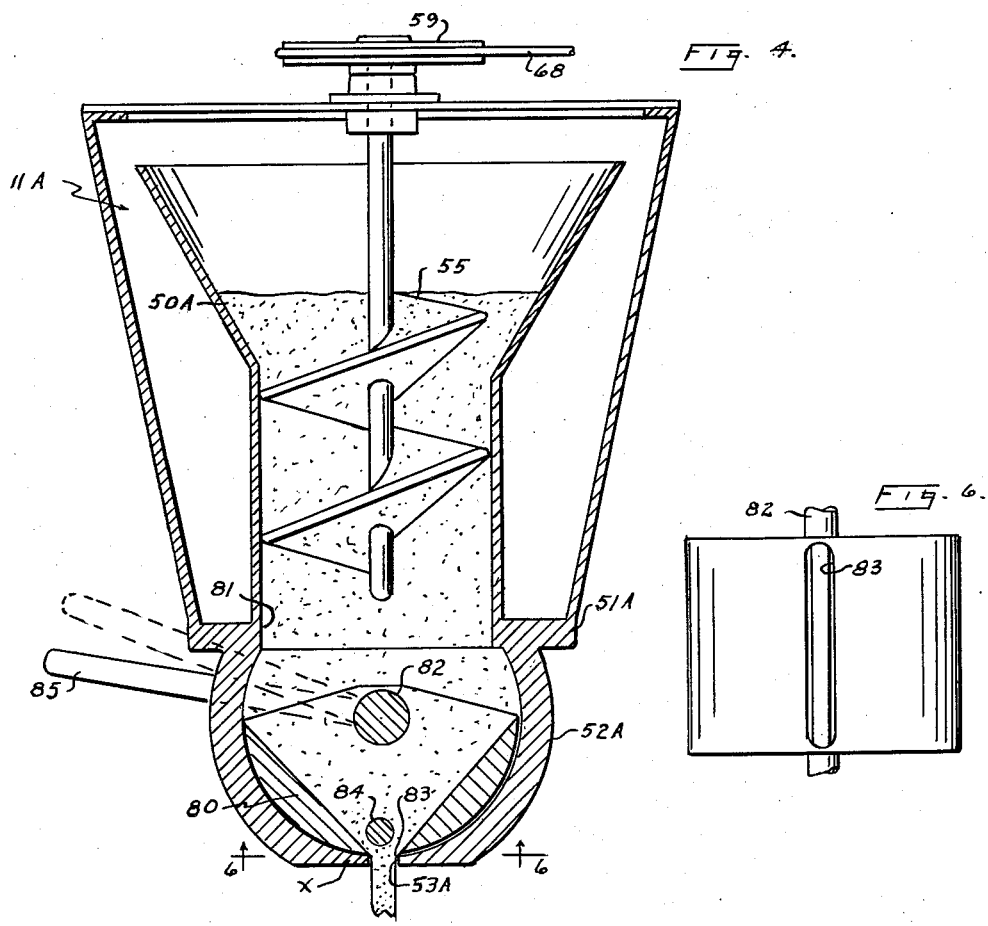
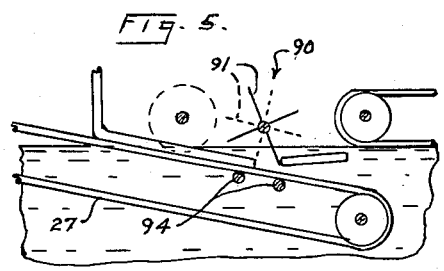
INVENTOR
FRANCIS E. PORAMBO
BY
AGENT

United States Patent Office 3,106,151
Patented Oct. 8, 1963

3,106,151
AUTOMATIC CRULLER MACHINE
Francis E. Porambo, Scotch Plains, N.J., assignor to Franchett's Kruellers, Inc., Elizabeth, N.J.
Filed Dec. 16, 1960, Ser. No. 76,176
2 Claims. (Cl. 99—353)

This invention is related to my issued Patent No. 2,926,597 and my pending application Serial No. 826,067, filed July 9, 1959, now Patent No. 3,060,837, issued October 30, 1962.

This invention relates to an automatic cruller producing machine and more particularly to a series of components which transform a dough mixture into a plurality of crullers of a particular size and shape. The cruller is produced in a continuous operation in which the dough is mixed and extruded in an uninterrupted thin layer through an exact sized throat or aperture, the layer of dough is laid upon a conveyor belt and the conveyor belt carries the layer of dough into a pre-heated shortening, which immediately changes the submerged dough mixture supported upon the conveyor belt into a expanding floatable partially cooked layer. The partially cooked dough is carried by the conveyor belt into contact with a rotating cutter which separates a predetermined quantity from the layer with each cutting operating as it advances and pushes the separated portion forward and it rises to float in the liquid shortening due to its extension as it is cooked. The separated portion is then retained at or near the surface of the liquid shortening as it is advanced by a second conveyor until it has completed the cooking cycle and the cooked cruller is then carried out of the shortening by a third conveyor and thoroughly drained and ejected from the device.

The prior art discloses automatic cruller forming devices, the general arrangement, that is, the components for handling the dough are different in structure and the method of handling the dough is different and the method of cutting and separating the dough is different and the configuration of the product produced is different and the partially cooked dough is submerged to a greater degree producing a far greater fat absorption during the cooking process. Thus the devices shown in the prior art, excepting my related issued patent, do not provide a similar device or a similar product.

It is an object of this invention to provide an automatic cruller forming device in which the dough mixture is automatically mixed and extruded to provided a continuous layer of a predetermined thickness of dough and in which the dough is carried into the pre-heated shortening and in which the partially cooked layer of dough is cut and separated into exact sized portions and carried forward at or about the surface of the shortening to finish the cooking operation and in which the completely cooked cruller is removed from the shortening properly drained and ejected from the device.

A further object of this invention is to provide an automatic cruller forming device in which the dough mixture is automatically mixed and extruded to provide a continuous layer of predetermined thickness of dough and in which the layer of dough is divided into a plurality of layers and in which the dough is carried into the pre-heated shortening and in which the partiality cooked layers of dough are cut and separated into exact sized portions and carried forward at or about the surface of the shortening to finsh the cooking operation and in which the completely cooked cruller is removed from the shortening properly drained and ejected from the device.

Other objects of this invention shall be apparent by reference to the accompanying detailed description and the drawings in which FIG. 1 illustrates a side elevational view of the apparatus partly in cross section, FIG. 2 illustrates a plan view taken on line 2—2 of FIG. 1, FIG. 3 illustrates an elevational view, partly in cross section, taken on line 3—3 of FIG. 1, FIG. 4 is an enlarged view partially in cross section, showing the dough feeding mechanism and the cut-off valve, FIG. 5 is an enlarged elevational view partly in cross section taken on line 5—5 of FIG. 2, and FIG. 6 is a partial detail of the extrusion throat valve taken on line 6—6 of FIG. 4.

Referring to the drawings and particulraly FIG. 1, there is illustrated a cruller manufacturing device 10. The device 10 includes an automatic dough feeding funnel 11A mounted on wheels 9, the wheels 9 being fitted to a pair of rails 8 that form a track, thus permitting the operator to move the feeding device 11 into a feeding position or out of position for loading. A shortening tank 12 is also provided and is divided into a deep fat cooking portion 14, a shallow fat cooking portion 15, and a fat draining portion 16. A shortening tank 17 is mounted above the tank 12. Tank 17 is connected by means of a pipe 18 with a shut-off valve 19 so that the shortening may be drained from tank 17 into tank 12 and the amount of shortening may be controlled by the valve 19. In order that the shortening in tank 17 will flow freely, a gas heater 20 may be mounted directly under tank 17. A gas heater 21 is mounted under the deep fat portion 14 of tank 12 and a gas heater 22 is mounted under the shallow fat portion 15 of tank 12. A continuous conveyor 24 is mounted in the portion 14 of tank 12. The conveyor is mounted to rotate about a pair of drums 25 and 26. It is to be noted drum 25 is mounted near the top of portion 14 so that a portion of the conveyor will actually be out of the fluid fat and that the drum 26 is mounted well below the surface of the fat. The conveyor consists of a belt 27 which may be of metal or any suitable substance which will sustain the temperature without harmful effects on the belt itself. The belt must remain flexible and durable to withstand a continuous operation. After the dough leaves the feeding funnel 11A, it passes through a throat or aperture and drops onto the portion of conveyor 24 that is extending out of the fluid fat or shortening. The dough is then carried into the shortening on the conveyor 24. A rotatable cutter 90 provided with separating blades 91 is mounted above the conveyor 24 and positioned adjacent the end of the conveyor. The blades 91 are wide enough to span the width of the conveyor 24 and are positioned so that the cutting or separating edge of each blade will rotate into a positive bearing relation with the upper surface of the conveyor, in fact they exert a slight pressure against the conveyor belt. In view of this slight pressure, the conveyor is provided with a pair of supporting bars 94 to maintain this positive contact with the cutter blades 91 which divide the layer of dough into successive equally sized portions which are dependent upon the spacing of the blades of the cutter and the speed of rotation. The speed of rotation will always be greater than the speed of belt or conveyor movement so that each blade as it cuts or separates the dough in addition acts as a pusher to propel the separated portion forward. The separated portion has by this time become buoyant and will start to rise in the liquid shortening, thus as the separated portion is pushed by the cutter or separating blade 91, it moves forward and is picked up by the conveyor 35, which is positioned slightly above the end of the conveyor 24 and is rotating so that its lower surface is at or slightly below the surface of the shortening. The separated portion of dough thus floats in the shortening but bears against the conveyor belt 35 and is carried forward for the remainder of its cooking cycle. The dough as mixed to be extruded must be of a slightly fluid consistency and is therefore quite sticky and has a tendency to completely flow into one mass when poured or extruded. In this condition no blade cutter would provide any cut or separation, as the dough would reflow and unite, therefore the dough when extruded onto the conveyor 24 sticks where it is laid or poured and retains the exact definition of width. The thickness is controlled by coordinating the rate of extrusion with the speed of the conveyor, there is no stretching due to the pull of the conveyor being too fast, nor pile up due to the speed of the conveyor being too slow. As the dough moves into the hot cooking liquid (shortening) there is a transformation, the dough loses its stickiness or tackiness at this instant it is still very tender and is easily cut and separated. The cutter blade provides the separation and due to the transformation occurring in the dough, it will not flow and tend to rejoin. Also at this time to insure a positive separation the cutter blade actually pushes the separated portion away from the advancing layer of dough. In order that conveyor 24 may be rotated as desired, either of the drums 25 or 26 may be used as the driving element. In this instance, drum 26 is connected through its shaft 32 which extends through the tank 12 to a reduction gear and motor (not shown) to maintain the movement of the conveyor at a predetermined speed during its operation. A second conveyor 35 is mounted above the portion 15 of tank 12 and comprises a pair of drums 36 and 37 mounted in parallel relationship at either end of the shallow portion 15. A conveyor belt 38 is mounted to rotate about drums 36 and 37, as illustrated in FIG. 1. The conveyor is mounted so that the lower surface of the conveyor belt will move and remain just slightly below the normal operating surface of the heated shortening to thus keep the partially cooked crullers below the surface of the shortening while carrying the crullers through a frictional contact with the belt through the portion 15 of tank 12 and allowing the completely cooked crullers to bob up towards the surface of the shortening liquid at the end of their travel. The conveyor 35 is driven by either of the drums 36 or 37. In this instance drum 37 is utilized, drum 37 being mounted on a shaft 34. Shaft 34 is mounted in bearings 39 at either edge of the tank and shaft 34 is connected to a reduction gear and motor (not shown) to provide a predetermined continuous speed of operation. A third conveyor 40 is provided in the portion 16 of tank 12. The conveyor consists of a pair of drums 41 and 42 with a conveyor belt 43 mounted to rotate about the drums. It is to be noted that drum 41 is mounted below the level of the shortening in the tank and slightly below the end of the second conveyor so that the cooked crullers will be ejected onto the surface of the conveyor belt 40. It is to be noted that drum 42 is mounted well above the level of the shortening so that the conveyor 40 will emerge from the fat or shortening carrying the crullers upward and allowing crullers to drain while being carried upward. A platform 44 may be mounted in juxtaposition to the conveyor belt at its highest point so that the completely cooked and drained crullers will be ejected after the cooking operation.

The device 11A is primarily a funnel 50A mounted on a base base plate 51A. The base plate 51A is the upper portion of a circular housing 52A in which an oscillating valve 80 is mounted. Housing 52A is provided with a circular aperture 81 of a diameter to equal the diameter of the funnel 50A at its base. Valve 80 is pivotally mounted on a shaft 82, shaft 82 being pivotally supported in both sidewalls A and B of the housing 52A. The housing 52A, at its extruding face X, is provided with an aperture 53A. The valve 80 is formed generally with a V-shaped inner portion and a half-round outer periphery. An aperture 83 is formed at the bottom of the inner V shape, passing through to the half-round outer periphery of the valve 80. The half-round outer periphery is of a slightly smaller diameter than the internal diameter of the circular housing 52A, so that valve 80 may be pivotally moved on shaft 82. The aperture 83 is simply an elongated slot, FIG. 6, to permit the dough that is forced downward from the funnel 50A to pass through the aperture 53A in housing 52A when shot 83 is in alignment with the aperture 53A. In FIG. 4 it is to be noted that arm 85 is mounted so that the end of arm 85 may be moved from its full line position to its dotted line position to close the throat or aperture 53A and stop the continuous flow of the mixed dough at the end of each operation and it is understood that arm 85 will be returned to its full line position with the beginning of a new extruding operation. To insure a flow of dough through and toward both edges of the apperture, a rod 84 is positioned slightly above the aperture 83 as shown in FIGS. 4 and 6; thus the dough will flow around rod 84 on each side forcing itself to completely fill aperture 83 as it is extruded through the aperture. It is apparent that by controlling the valve 80 either way, the pivotal movement may be utilized to control the thickness of the flow of dough. In this particular embodiment of the invention, the desired thickness of the layer of dough should be as close to a 32d of an inch or .0312, as this desired thickness, when laid upon the conveyor, produces a cooked portion that is approximately ½" or .5. The reason for retaining these particular dimensions is governed by the use of the product when it is to be consumed. The product is primarily designed to be inserted in a toaster to enhance its edibility and the accepted toaster aperture thickness varies from ½ to 9/16 or .5 to .562. If the extrusion layer is allowed to exceed the desired thickness, for example, if a layer of .060 is extruded, the cooked portion expands to 1.00 and of course this is entirely too thick for the intended use of this product. However the variance in thickness of the layer may be determined by the particular use other than a normal toaster if so desired.

The length of the aperture 53A will control the width of the layer of dough that is extruded while the movement of valve 80 controls the thickness of the dough extruded. Thus the desired size of the layer of dough depends upon aperture 53A. Thus if a single line of separated portions is to be produced by the machine, the aperture will be of a dimension equal to the average slice of bread or in this embodiment equal to the length of the portions that are cut and separated from the line. However in a further embodiment of this invention a plurality of rotating dough separators 92 may be mounted on a shaft 93 and positioned over conveyor 27 so that the layer of dough may be divided into a plurality of strips. In this further embodiment the cutter or separator 90 is longer to provide cutting blades 91 that cut and separate all of the extruded layers as they advance on the conveyor 27. And further, in such an embodiment the remainder of device must be wide enough to carry the separated portions in a plurality of cooking lines so that the cooked portions are extruded in a plurality of separate lines. With a scew arrangement 55 mounted in the funnel 50A, a pulley wheel 59 may be mounted at the top of the shaft supporting the screw 55. A belt 68 is provided to drive pulley 59, belt 68 passing to a pulley (not shown) and driven by a motor (not shown). Thus the screw 55, if driven at the proper speed, will produce the desired degree of movement of the dough through the aperture 81 into the valve housing and through the valve's V-shaped interior around the spreader rod 84 and through the slot 83 and in turn through the predetermined size aperture 53A.

It is apparent, referring to FIG. 1, that the motors, namely the motor driving the feed screw and the motors driving each of the three conveyors, may be controlled independently or may be connected to operate in unison.

Either method will work satisfactorily as all of the motors are necessarily operated during the operation of this device. It is also to be noted, referring to FIG. 1, that the gas heaters may be operated separately with advantage; that is, the gas heater 20 may be first operated to change the shortening from a solid state to a fluid state and gas heater 20 may be reduced in its heat to the amount necessary to maintain the shortening in a fluid condition. Gas heaters 21 and 22 are necessarily started to maintain the shortening in a fluid condition. However, gas heater 21 and gas heater 22 may be controlled by separate thermostatic means, T and T', as it may be advantageous to maintain gas heater 21 at a higher degree of heat because it is mounted under the deep fat portion of the tank while gas heater 22 may be maintained at a different temperature being under the shallow fat portion of the tank. At any rate, a desired predetermined temperature should be maintained for the initial cooking operation and for the continuous cooking operation.

Referring to FIG. 5 there is illustrated an enlarged detail of the device illustrated in FIG. 2. In the preferred embodiment the rotating layer separating blades 92 are not utilized as a single layer of dough is extruded and laid upon the conveyor 27 to be cut and separated by each blade 91 of the rotating cutter 90. It is to be noted that the uncooked dough laid upon the conveyor 27 enters the pre-heated shortening liquid and is instantly affected by the hot liquid to cause an expansion of the dough. At this point the layer of dough is easily cut and separated. Therefore the cutter 90 is positioned at this point so that the blades 91 will have little or no resistance to the separation of the layer of dough. To insure a clean or thorough separation, the conveyor 27 is supported underneath this particular area by a pair of bars 94 so that conveyor 27 can not sag or give when the cutter blade 91 bears upon the dough and penetrates to the surface of the conveyor. When the dough has been separated into a desired sized portion which is predetermined by the spacing of the blades 91 in the cutter 90 and the speed of rotation with relation to the speed of movement of the conveyor 27, the ideal size of each portion of dough is approximated by the general size of a slice of bread so that the dough portions may be inserted in a toaster as a slice of bread is normally inserted in a toaster. The separated portion of dough will rise in the shortening due to the expansion of the dough making it a floating portion and lifting it from the conveyor 27. At this point the cutter blade 91 rotating in a counterclockwise motion (FIG. 1) will provide a pusher to move the portion of dough forward and under the next conveyor 35 where the portions of dough are carried forward to continue the cooking operation before they are picked up by the third conveyor and discharged from the apparatus. In the further embodiment of this invention wherein the rotating separating blades 92 are utilized, it is to be understood that the width of the aperture 53A has been increased to provide a much wider layer of dough and the conveyors are all designed wide enough to receive the wider layer of dough extruded. In this further embodiment the rotating blades 92 will separate the layer of dough into a plurality of strips and the plurality of strips will be acted upon by the cutter 90 and the cooking operation will be the same as that already described.

Although the device has been disclosed as a plurality of components connected in a particular order, it is apparent that the cruller dough mixture may be supplied from a different type of feeding device without departing from the spirit of this invention and the conveyors may be changed in their size, their length, or the particular angle of mounting without departing from the spirit of this invention, and the tank provided for retaining the shortening may be changed in its shape or its length without departing from the spirit of this invention and the manner of heating this device may be any form of heat, whether gas, electric or coal, without departing from the spirit of this invention, and the particular shortening, of course, may be varied as long as it provides the necessary fluid bath for the crullers during the cooking operation and the size of the extruding aperture may be changed to provide different shape and size dough portions. The layer of dough will first contact the moving conveyor and be carried away from the extruding aperture so that the layer of dough will fall into a flat supported position on the conveyor. It is also to be understood that the cutter or separating device may be changed to provide more or less blades and its speed of rotation may be changed to provide the desired size separation of portions with relation to the speed of the conveyor and dough being extruded and the design of the cutter whether a plurality of blades or a drum with raised portions thereon may be utilized as long as the manner of separating is the same without departing from the spirit of this invention. The general form of this embodiment will resemble a slice of bread or cake. Other changes may be made for the formation of coking dough for each operation without departing from the spirit of this invention, and this invention shall be limited only by the appended claims.

What is claimed is:

1. A cruller producing machine which includes a dough feeding device, said dough feeding device having an extruding aperture to control the width of the dough extruded, a cooking tank filled with shortening to a predetermined level and maintained at a cooking temperature, a first conveyor system to carry the dough extruded into the cooking tank and shortening, a rotating cutter mounted over said first conveyor so that the cutting edge of the blades will coact with and is against the first conveyor below the surface of the shortening, said cutter having at least one of its cutting edges below the surface of the shortening to seal by cooking the edge of the separated dough, said cutter rotated at a speed faster than said first conveyor to push and propel the cut portion of dough forward, a second conveyor the bottom surface of which carries the partially cooked portions of dough forward while submerged in said shortening through said tank during the cooking cycle and a third conveyor to carry the cooked cruller from the tank out of the shortening and eject the cruller from the machine, means to operate said dough cut off device in a repeating cycle, and means to establish the shortening at a predetermined level that is above the cutting surface of the cutting blade and at least up to the bottom surface of the second conveyor in said tank.

2. In a device according to claim 1 in which there are provided a plurality of circular cutters positioned above and adjacent said first conveyor to separate the extruded dough into a plurality of strips of dough.

References Cited in the file of this patent

UNITED STATES PATENTS

| | | |
|---|---|---|
| 2,915,992 | Gilmore | Dec. 8, 1959 |
| 2,926,597 | Parambo | Mar. 1, 1960 |
| 2,938,474 | Filler | May 31, 1960 |